United States Patent [19]

Habu et al.

[11] Patent Number: 4,559,599
[45] Date of Patent: Dec. 17, 1985

[54] OPTIMUM SHIFT POSITION INDICATION USING SUCCESSIVE TWO-DIMENSIONAL DATA MAPS

[75] Inventors: Nobuo Habu; Kouichi Osawa; Yuuichi Kato; Michio Furuhashi; Taiyo Kawai; Junichi Saiki; Toshio Ito, all of Susono; Tsutomu Nakamura, Kariya, all of Japan

[73] Assignees: Nippondenso Co., Ltd., Kariya; Toyota Jidosha Kabushiki Kaisha, Toyota, both of Japan

[21] Appl. No.: 474,324

[22] Filed: Mar. 11, 1983

[30] Foreign Application Priority Data

Mar. 18, 1982 [JP] Japan ................... 57-43655

[51] Int. Cl.[4] ............ B60K 41/18; G09B 19/16; G07C 5/08
[52] U.S. Cl. ......................... 364/424.1; 340/52 D; 364/442; 434/71
[58] Field of Search ............... 364/424.1, 442; 434/71; 340/52 R, 52 D, 52 F

[56] References Cited

U.S. PATENT DOCUMENTS

| 4,150,497 | 4/1979 | Weber | 434/71 |
|---|---|---|---|
| 4,198,882 | 4/1980 | Kiencke et al. | 74/866 |
| 4,294,341 | 10/1981 | Swart | 74/766 X |
| 4,320,381 | 3/1982 | Olivier | 340/52 F |
| 4,350,057 | 9/1982 | Kishi et al. | 74/866 |
| 4,354,173 | 10/1982 | Kuhn et al. | 340/52 F |
| 4,355,296 | 10/1982 | Drone | 340/52 R |
| 4,411,174 | 10/1983 | Yokoi et al. | 74/866 |
| 4,428,257 | 1/1984 | Meyerle et al. | 74/866 |
| 4,438,423 | 3/1984 | Stier | 340/52 R |
| 4,439,158 | 3/1984 | Weber | 434/71 |
| 4,463,427 | 7/1984 | Bonnetain et al. | 364/442 |

FOREIGN PATENT DOCUMENTS

| 2748227 | 6/1978 | Fed. Rep. of Germany . |
|---|---|---|
| 3128080 | 2/1983 | Fed. Rep. of Germany . |
| 6235 | 1/1979 | Japan . |
| 2091358 | 7/1982 | United Kingdom ............ 364/442 |

Primary Examiner—Felix D. Gruber
Attorney, Agent, or Firm—Cushman, Darby & Cushman

[57] ABSTRACT

A shift indication apparatus having an engine rotation sensor, a throttle valve sensor, and a shift position sensor, a microcomputer having a ROM and RAM for storing data corresponding to the engine speed, throttle valve openings, and the shift positions therein, and an indicator for indicating preferable shift positions to be performed by a driver in which a torque data map and a fuel consumption rate data map have stored in the ROM for calculating various torque and fuel consumption rates so as to obtain preferable shift positions relating to optimum fuel consumption rate in accordance with said data detected. With this construction, it becomes possible for a driver to run his car in accordance with the indications of the shift operation on the indicator so as to enable the economical running of the car to be realized.

12 Claims, 4 Drawing Figures

OPTIMUM SHIFT POSITION INDICATION USING SUCCESSIVE TWO-DIMENSIONAL DATA MAPS

BACKGROUND OF THE INVENTION

1. Field of the Invention

The present invention relates to a shift indication unit which can be used for an automotive vehicle having a manual transmission and for indicating to a driver change-speed operations to be performed relating to preferable shift position with respect to optimum fuel consumption, and a method of performing the optimum speed change operation so as to reduce fuel cost.

2. Description of the Prior Art

Recently, the situation and circumstances surrounding supply of oils have deteriorated, and various research and development activities have been made in response in an attempt to improve efficient utilization of energy in each technical field in industry. The situation is the same in the autombile industry, where various research and development for improving engines to have better thermal efficiencies and for pursuing better methods for performing effective combustion of fuel for vehicles with less fuel consumption rate have been undertaken. However, there is a problem that unless operations including acceleration operation and shift operation are included, it is not possible for driving operation to sufficiently demonstrate the improved fuel consumption performance thus reached.

SUMMARY OF THE INVENTION

It is therefore a main object of the present invention to provide a shift indication apparatus which is capable of performing optimum running with a good fuel consumption rate by indicating to a driver preferable shift positions for the optimum fuel consumption during the running of the automotive vehicle.

It is another object of the present invention to provide a shift indication apparatus having a microcomputer including a speed change instruction indicator and a ROM in which predetermined torque and fuel consumption maps are stored so as to calculate and indicate on the indicator preferable shift positions corresponding to the optimum fuel consumption rate.

It is still another object of the present invention to provide a speed change operation and indication unit having a microcomputer comprising a ROM and a RAM into which data corresponding to the current engine speed and current shift position as well as throttle valve opening are stored and expected torque and fuel consumption rates are calculated from the data read from the RAM together with the predetermined maps.

According to one feature of the present invention, the shift indication apparatus is characterized in that the unit comprises sensors for detecting the engine speed and the opening of a throttle valve, means for calculating an expected or assumed fuel consumption rate in order to generate the same driving horsepower as that in the current car running conditions at a certain shift position adjacent to the particular shift position of the transmission at that time, means for comparing the current fuel consumption rate with the assumed fuel consumption rate so as to select a preferable shift position with the optimum fuel consumption rate, and means for indicating to the driver shift operation instructions to the preferable shift position.

These and other objects and advantages of the present invention will become more apparent from the following detailed description with reference to the accompanying drawings.

DESCRIPTION OF THE PREFERRED EMBODIMENT

Figure 1:
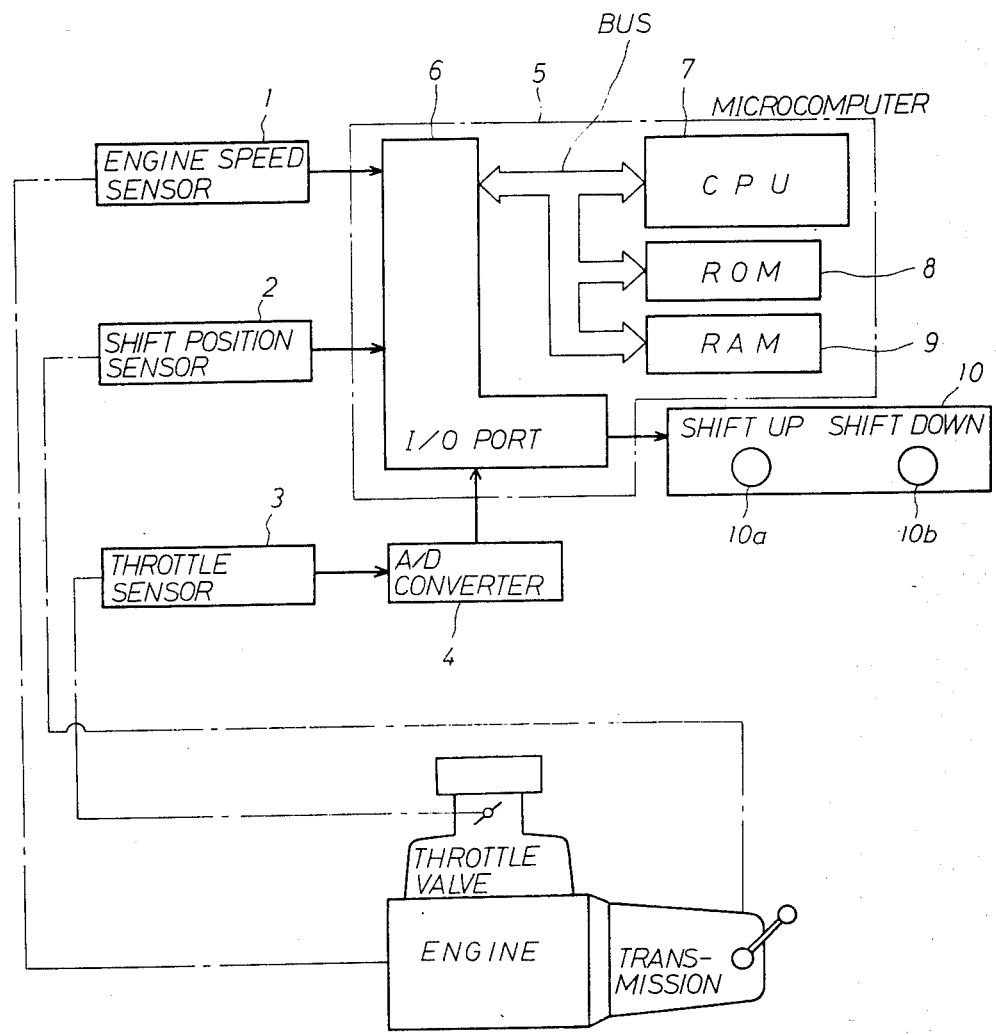
FIG. 1 is an overall construction of one embodiment of the shift indication apparatus according to the present invention.

Referring to FIG. 1, the shift indication apparatus with a manual transmission according to the present invention comprises an engine speed sensor 1 for detecting the engine speed and for producing pulse signals of a frequency proportional to the engine speed, a shift position sensor 2 for detecting the shift positions of the transmission, a throttle sensor 3 for detecting the opening degree of the throttle valve by means of, for instance, a potentiometer, an A/D converter 4 for converting analog signals from the throttle valve sensor 3 into digital signals, a microcomputer 5 for performing various calculations in accordance with the different signals from the sensors, and an indicator 10 for indicating the result of the calculations.

The microcomputer 5 further comprises an input-/output port (I/O port) 6, a central processing unit (CPU) 7, a read only memory (ROM) 8, and a random access memory (RAM) 9. In the microcomputer 5, there is provided a bus BUS which communicates the I/O port 6 and the CPU 7, ROM 8, and RAM 9.

The engine speed sensor 1 is mounted in a distributor (not shown) and the output of the sensor is connected to the input of the I/O port 6 so as to transmit the output pulses to the microcomputer 5 through the I/O port 6 and to store the data corresponding to the engine speed into the RAM 9. The output of the shift sensor 2 is connected to the input of the I/O port 6 so as to transmit the output signals thereof to the microcomputer 5 through the I/O port 6 and to store the data from the shift sensor 2 into the RAM 9. Similarly, the output of the throttle sensor 3 is connected through the A/D converter 4 to the input of the I/O port 6 so as to transmit the output signals thereof to the microcomputer 5 through the A/D converter 4 and to store the data corresponding to the throttle value opening into the RAM 9 after converting from the analog signals into the digital signals. The input of the indicator 10 is connected to the output of the I/O port 6 so as to indicate each preferable shift position corresponding to the optimum fuel consumption rate in accordance with various parameters calculated.

The indicator 10 includes a shift-up indicating lamp 10a and a shift-down indicating lamp 10b.

The indicator 10 may be assembled by light emiting diodes (LED) so as to perform shift-up and shift-down indications by up and down directed arrow marks. Alternatively, the indicator 10 may also be replaced with other voice combining circuit so as to announce the shift operations by voice instead of the indications.

Figure 2:
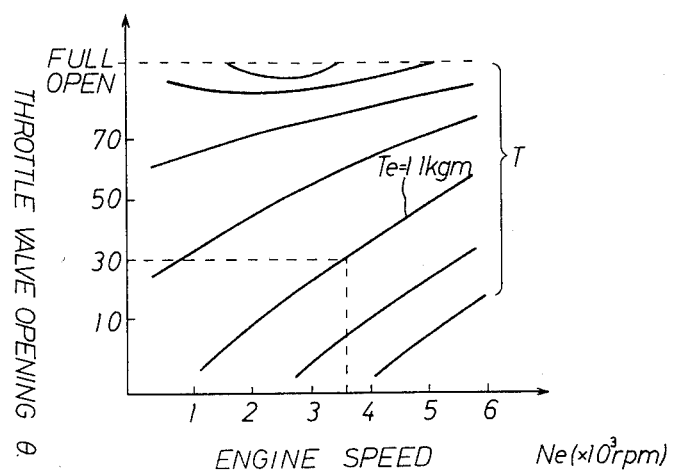
FIG. 2 is one example of the characteristic curves of a torque data map stored in the ROM in the microcomputer in FIG. 1
Figure 3:
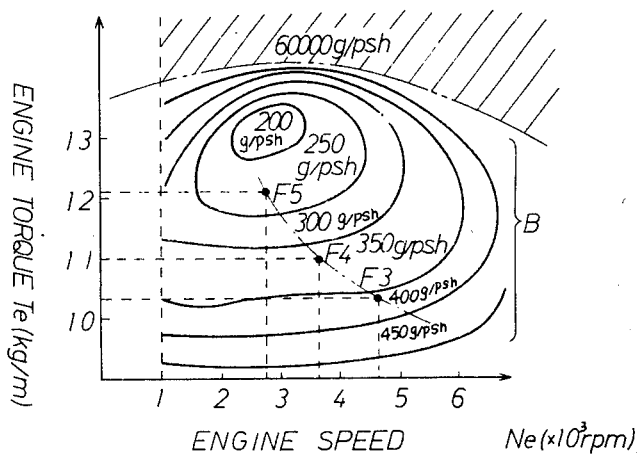
FIG. 3 is one example of the characteristics of a fuel consumption data map stored in the ROM in the microcomputer in FIG. 1.

Before explaining the operation of the apparatus according to the present invention, reference must be made to the torque data map shown in FIG. 2 and the fuel consumption rate data map shown in FIG. 3. The torque data map indicative of torque curves T as shown in FIG. 2 has been stored in the ROM 8 in advance. The fuel consumption rate data map indicative of equal fuel consumption rate curves B as shown in FIG. 3 has been also stored in the ROM 8 in advance. In FIG. 2, each equal torque curve T was prepared by plotting and connecting equal torque points on the graph with respect to the engine speed vs. throttle valve opening. In FIG. 3, each fuel consumption rate curve B was prepared by plotting and connecting equal fuel consumption rate points on a graph obtained in advance by experiment data with respect to the engine speed and the torques thus calculated.

In operation, the microcomputer 5 functions in such a manner that it determines current torque from the torque data map stored in the ROM 8 and other data corresponding to the engine speed detected by the sensor 1 and throttle valve opening detected by the throttle sensor 3, determines expected fuel consumption rate from the fuel consumption rate data map also stored in the ROM 8 and the torque thus determined as well as the engine speed, and compares the fuel consumption rate thus determined with an assumed fuel consumption rate when speed change operation is performed from the current shift position to the adjacent shift position in accordance with a control program, whereby an instruction signal for changing suitable shift position relating to optimum fuel consumption rate is generated from the microcomputer and it is indicated on the indicator 10.

Figure 4:
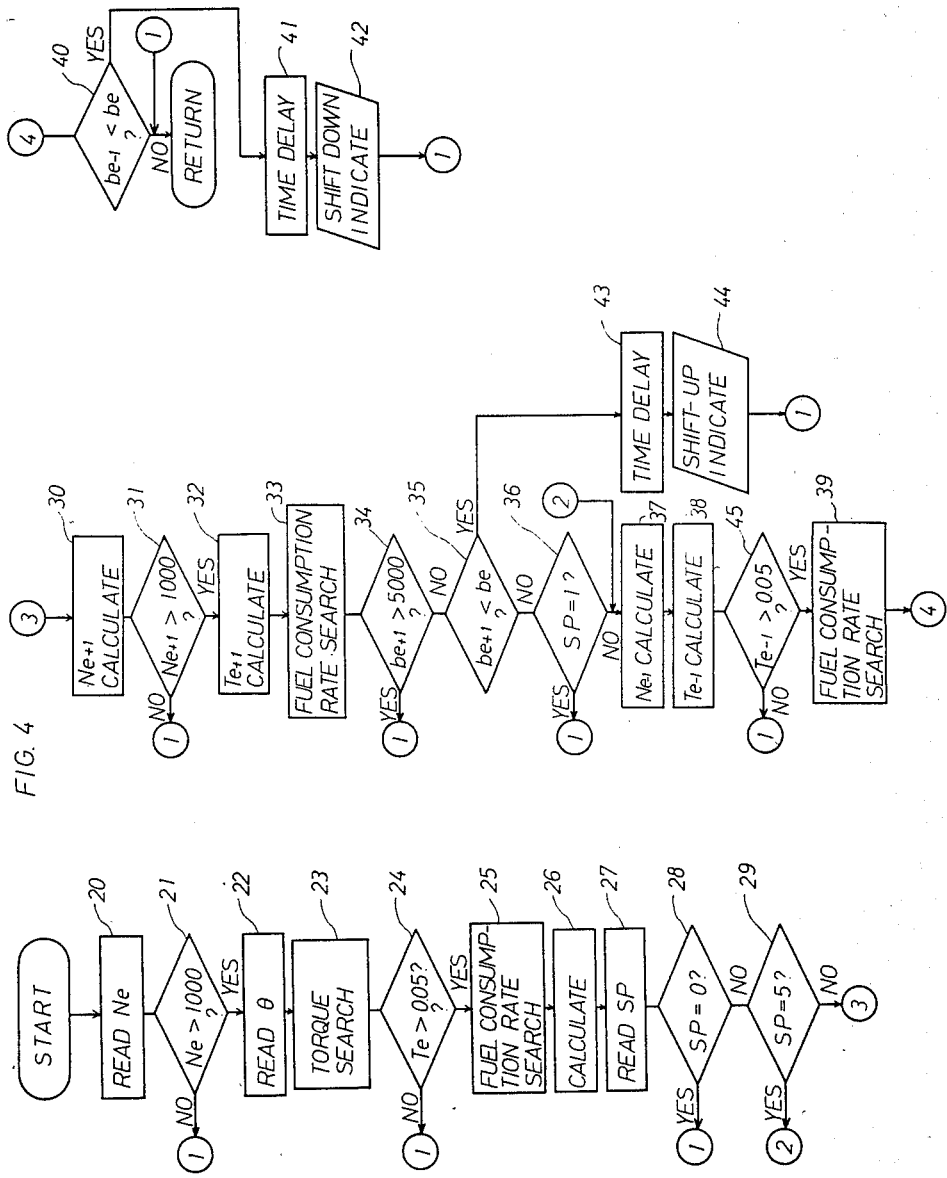
FIG. 4 is a programmed flow chart of the speed change operation indicating unit of FIG. 1 for the purpose of explaining the operation of the unit according to the present invention.

The operation of the shift indication apparatus will now be made with reference to the control program flow chart shown in FIG. 4.

First of all, the engine speed sensor 1 produces pulse signals proportional to the engine speed during running of the automotive vehicle and transmits these signals to the microcomputer 5. In this case, as shown in FIG. 4, the operation of a main routine is started at a predetermined timing, e.g. periodical timing pulses from a timer (not shown) and the detection of the engine speed $N_e$ from the sensor 1 is carried out and it is stored into the RAM 9 at the step 20. Then, the engine speed $N_e$ is read from the RAM 9 and it is compared with a predetermined number N (=1000 rpm) to determine whether or not the $N_e$ exceeds the value 1000 at the step 21. If the result of the decision is YES, the next step 22 is executed. That is, in the step 22, the reading in of the opening of the throttle valve is performed through the throttle sensor 3 and the A/D converter 4. In the above case, if the result of the decision in step 21 is NO, the main routine is terminated by determining that the shift operation is not necessary and the engine speed $N_e$ is read again at the predetermined timing and now the operation returns to the step 20.

In the step 22, the throttle valve opening $\theta$ is detected by the throttle sensor 3 and is then stored in the RAM 9 after conversion from the analog signals into the digital signals through A/D converter 4. The next step 23, i.e. the torque search step is executed. In this step, the torque $T_e$ is determined from the torque curves T on the torque data map as shown in FIG. 2 and which has been stored in the ROM 8 in the microcomputer 5, in accordance with the detected data corresponding to the engine speed $N_e$ and the throttle valve opening $\theta$. In this case, assuming that the engine speed $N_e$ is 3600 rpm and the throttle valve opening $\theta$ is 30 degrees, the torque value $T_e=11$ kg·m is determined from the cross point on the torque curve T in the torque data map.

Then in the next step 24, i.e. the torque determination step is executed. In this step 24, a decision is made as to whether or not the value of the torque $T_e$ thus calculated in the step 23 is larger than 0.05 kg·m, i.e. the vehicle speed is in the middle of speed reduction or it is close to the speed reduction. If the result of the decision is YES, the next step, fuel consumption search step 25, is executed, if the result of the the decision is NO, the operation of the main routine terminates. In the step 25, the fuel consumption data is read from the equal fuel consumption rate curves B on the fuel data map shown in FIG. 3 which has been stored in the ROM 8 and fuel consumption rate is searched from the calculated torque $T_e$ and the engine speed $N_e$.

Namely, if the shift position is in the fourth speed, as the torque $T_e$ is 11 kg·m and the engine speed is 3600 rpm, the point F4 is obtained on the fuel consumption rate curves B in the fuel consumption rate data map. Since the point F4 is in the area of the fuel consumption rate $B_e=300$ g/psh to 350 g/psh, the fuel consumption rate of the fourth speed is determined as 300 g/psh to 350 g/psh in this case.

Then the next horsepower calculation step 26 is executed. In this step 26, the horsepower P is calculated in accordance with the following equation.

$$P = N_e \times T_e / 716.2$$

P=driving power in ps
where
$N_e$=the engine speed in rpm
$T_e$=torque in *kg·m*

In the step 27, the detected data from the shift position sensor 2 is stored in the RAM 9 in the microcomputer 5 through the I/O port 6.

In the step 28, a neutral position decision is performed. That is, the decision is made whether or not the shift position stored in the step 27 is in the neutral position, i.e. whether or not SP=0 is determined. If it is not the neutral in this case, the step 29 for deciding the fifth speed is executed. On the other hand, if the result of the decision is neutral, the main routine operation is terminated as it is not necessary to indicate the speed change operation.

In the step 29, since the shift position SP is determined as the fifth speed or the upmost shift position, the assumed processing for shifting up operations shown in the steps 30 through 36 is skipped and now the operation moves to the calculating step for the number of engine rotations at the time of the shifting down in the step 37.

On the other hand, if the result of the decision in the step 29 is such that the shift position SP is not at the fifth speed, the next step 30 is executed. In this step 30, the engine speed $N_{e+1}$ is calculated in the case of one shift-up. In this case, the equation for calculating the engine speed $N_{e+1}$ is as follows;

$N_{e+1} = N_e \times$ gear ratio of shift position $SP_{+1}$/gear ratio of shift position SP where, each unit indicates: $N_e$ =rpm, $N_{e+1}$= rpm, and the gear ratio is a physical quantity which one of ordinary skill understands is dictated by the physical embodiment of the gears used (and which ratios are stored as data for use with a particular embodiment).

After executing this step, the operation now moves to the step 31 for deciding the engine speed $N_{e+1}$. In this step 31, a decision is made as to whether or not the engine speed $N_{e+1}$ at the one step shifting up position SP $_{+1}$ is larger than 1000 rpm. In this case, if the result of the decision is NO, the processing for the main routine is terminated as the shift operation is not necessary. However, if the result of the decision is such that the engine speed $N_{e+1}$ is larger than 1000 rpm, the operation now moves to the next step 32. In this step 32, the calculation of the torque $T_{e+1}$ at the one step shifting up position SP $_{+1}$ is performed.

The calculation of the torque is performed in accordance with the following equation.

$$T_{e+1} = P \times 716.2/N_{e+1}$$

where, each unit indicated
$T_{e+1}$=kg/m
P=ps, and
$N_{e+1}$=rpm.

And now the operation moves to the next step 33. In this step 33, the assumed fuel consumption rate is searched from the data map stored in the ROM 8 in the microcomputer 5. Namely, one cross point is sought from the engine speed $N_{e+1}$ which was calculated in the step 30 and the torque $T_{e+1}$ calculated in the step 32 on the data map shown in FIG. 4. From the fuel consumption rate indicated in the equal fuel consumption rate curves B surrounding this point in the coordinate positions, the assumed fuel consumption rate $b_{e+1}$ can be found. For instance, assuming that the engine speed $N_{e+1}$=2800 rpm and the torque $T_{e+1}$=12.1 kg·m, the cross point F5 can be obtained from the data map and this point F5 belongs to the area of the fuel consumption rate of 200 g/psh to 250 g/psh in the equal fuel consumption rate curves B. Accordingly, since the one step shifting up position SP $_{+1}$, i.e. the current shift is the fourth speed, the assumed fuel consumption rate $b_{e+1}$ when shifting up to the fifth speed, becomes 200 g/psh to 250 g/psh.

The assumed fuel consumption rate $b_{e+1}$ thus searched (i.e., derived) in step 33 is compared with a predetemined value in the next decision step 34. That is, the fuel consumption rate $b_{e+1}$ is determined whether or not it is larger than 5000 g/psh. In this case, a large number such as 60000 g/psh is inputted in the area above the full opened torque in FIG. 4. Accordingly, if the result of the decision is NO, the assumed fuel consumption rate $b_{e+1}$ is compared and is determined in the next step 35 as to whether or not it is smaller than the current fuel consumption rate $b_e$ which was searched (i.e., derived) in the step 25.

If the result of the decision is YES, that is, the assumed fuel consumption rate $b_{e+1}$ is smaller than the current fuel consumption rate $b_e$, the operation now moves to the step 43 and the operation for indicating the shift-up condition is performed in the step 44 after some delay time. Namely, in this step, the speed change operation indicating signal is applied to the indicator or display 10 from the microcomputer 5 through the I/O port 6. As a result, a particular lamp in this case, a shift-up indicating lamp in the indicator 10, is illuminated, thus indicating to the driver that the speed change from current shift position to the one step shifting up position SP $_{+1}$ is preferable. In this case, it is preferable to provide some delay time as shown in the step 43 so as to prevent the driver from confusion due to intermittent illuminations of the lamp of the indicator 10 within a short time when the fuel consumption rate is on the critical border lines.

On the other hand, if the result of the decision in the step 35 is NO, that is, the assumed fuel consumption rate $b_{e+1}$ is larger than the current fuel consumption rate $b_e$, the operation now moves to the step 36. In this step 36, the decision is made whether or not the current shift position SP is the first speed. If the result of the decision is YES indicating that the current shift position is the first speed, the processing for the main routine is terminated as no shift-down operation is required, while if the result of the decision is NO, the operation now moves to the next step 37 for calculating the engine speed $N_{e+1}$ at the one step shifting down position SP $_{-1}$. In this step, the engine speed $N_{e+1}$ at the time of shifting down from the current shift position SP to the one step shifting down position SP $_{-1}$ is calculated by the following equation;

$$N_{e-1} = N_e \times \text{gear ratio of shift position SP}_{-1}/\text{gear ratio of shift position SP}$$

where, each unit of each parameter indicates
$N_{e-1}$=rpm
$N_e$=rpm.

From the engine speed $N_{e-1}$ calculated here and the driving power which was calculated in the step 26, the torque $T_{e-1}$ is calculated by the following relationship in step 38;

$$T_{e-1} = P \times 716.2/N_{e-1}$$

where, each unit of each parameter indicated
$T_{e-1}$=kg·m,
P=ps,
$N_{e-1}$=rpm.

The torque thus calculated is compared with a predetermined value such as 0.05 kg·m in the step 45. If the result of the decision in step 45 is YES, the operation now moves to the fuel consumption rate search step 39, where the assumed fuel consumption rate $b_{e-1}$ in the one step shifting down position $SP_{-1}$ is searched from the data map in FIG. 3 as in the step 33. Namely, if the engine speed $N_{e-1}$ is 4600 rpm and the torque $T_{e-1}$ is 12 kg·m which were calculated in the steps 37 and 38, the cross point F3 is determined on the data map in FIG. 4. Accordingly, in step 39, from the area of the equal fuel consumption rate curve B of 350 g/psh to 400 g/psh on which the cross point F 3 is situated, the assumed fuel consumption rate $b_{e-1}$ is searched to be found in the one step shifting down position SP $_{-1}$.

With the one step shifting down position SP $_{-1}$ thus obtained, i.e. the current shift position SP being as the fourth speed, the assumed fuel consumption rate when shifting down to the third speed which is in the shift position SP $_{-1}$ thereunder, becomes 350 g/psh to 400 g/psh, and then the next step 40 is executed. In this step 40, the fuel consumption rate $b_e$ in the current shift position SP which was searched in the step 25 is compared with the assumed fuel consumption rate $b_{e-1}$. Namely, the decision making is performed whether or not the assumed fuel consumption rate $b_{e-1}$ is smaller than the current fuel consumption rate $b_e$. If the result of the decision is NO which means that the $b_{e-1}$ is larger than the $b_e$, the processing for the main routine is terminated. On the other hand, if the result of the decision is YES, meaning that the assumed fuel consumption rate $b_{e-1}$ is smaller than the current fuel consumption rate $b_e$, the operation moves to the next step 41, where some time delay processing is performed, and then the operation now moves to the step 42.

In this step 42, shift-down display is performed. Namely in this case, the shift down display instruction signal from the microcomputer 5 is applied to the indicator 10 through the I/O port 6 and the shift-down indication lamp in the indicator 10 is illuminated, thus indicating to the driver that speed change operation from the current shift position to the one step shifting down position $SP_{-1}$ is preferable.

In this manner, the operations as indicated in each step are repeatedly performed and the assumed fuel consumption rate $b_{e+1}$ in the one step shifting up position and the assumed fuel consumption rate $b_{e-1}$ in the one step shifting down position from the current shift position are calculated respectively, and each assumed fuel consumption rate is compared with the current fuel consumption rate $b_e$, respectively. In this case, if the current fuel consumption rate $b_e$ is better than the assumed fuel consumption rate $b_{e+1}$ or the assumed fuel consumption rate $b_{3-1}$, the indicator 10 is not energized. However, only when either one of the assumed fuel consumption rates above is better than the current fuel consumption rate $b_e$, the corresponding shift-up lamp or shift-down lamp in the indicator 10 is illuminated, thus indicating the necessity of the speed change operation. As a result, the driver can actually perform the speed change operations in accordance with the indications so that the optimum speed running of the car can be carried out with a preferable shift position in the optimum fuel consumption rate.

In the preferred embodiment according to the present invention described in the foregoing, the range of each area indicative of the equal fuel consumption rate curves B has been indicated as 50 g/psh. However, if the range of each area is defined more narrow or the distances between the points is interpolated by calculation, it is possible to indicate more accurate speed change operations.

As stated in the foregoing, in the speed change operation and indication system according to the present invention, the optimum fuel consumption rate is calculated from the data corresponding to the number of engine rotation and the throttle valve opening, an assumed fuel consumption rate is calculated for generating the same driving power as that in the current running conditions in the shift position adjacent to a particular shift position at that time, and the current fuel consumption rate is compared with the assumed fuel consumption rate, whereby the optimum shift operation indications are displayed to the driver.

With this construction, it is possible for a driver to run his car in accordance with the indication of the speed change operation on an indicator so as to maintain the optimum fuel consumption of the automotive vehicle, thus enabling the economical running of the car to be realized.

While the invention has been described in its preferred embodiments, it is to be understood that various changes and modifications may be made within the purview of the appended claims without departing from the true scope and spirit of the invention in its broader aspects.

What is claimed is:

1. An electronically controlled system in an internal combustion engine for indicating shift position for a manual transmission thereof so as to maintain optimum fuel consumption by the engine, comprising:

first detecting means for detecting current engine speed;

second detecting means for detecting current throttle position;

third detecting means for detecting current shift position;

first determining means for determining current engine torque based on said current engine speed and current throttle position in accordance with a first two-dimensional map of engine speed and throttle position;

second determining means for determining current fuel consumption rate based on said current engine speed and determined current engine torque in accordance with a second two-dimensional map of engine speed and engine torque, said second map including isometric curves representing curves of equal fuel consumption rates;

calculating means for calculating driving force of the engine in accordance with current engine speed and current engine torque, said calculating means further including:

first comparing means for comparing said current fuel consumption rate obtained by said second determining means with an assumed one-step-transmission upshifted fuel consumption rate determined by one-step-transmission upshifted engine speed and one-step-transmission upshifted engine torque defined by said second map, second comparing means for comparing said current fuel consumption rate obtained by said second determining means with an assumed one-step-transmission downshifted fuel consumption rate determined by one-step-transmission downshifted engine speed and one-step-transmission downshifted engine torque defined by said second map, outputting means for outputting a first signal indicative of one-step upshifting, a second signal indicative of one-shift downshifting, or a third signal indicative of stopping both one-step upshifting and downshifting, respectively, whenever said first comparing means determines said assumed fuel consumption rate of one-step upshifting is less than the currently detected fuel consumption rate, said second comparing means determines said assumed fuel consumption rate of one-step downshifting is less than the currently detected fuel consumption rate, or both values of fuel consumption rate calculated in said first and second comparing means are detemined greater than the currently detected fuel consumption rate; and representing means for alternatively representing whichever of said three signals are output by said outputting means.

2. A system in claim 1 wherein said first comparing means comprises first determination means for determining whether the current gear position is highest gear or neutral position, and for enabling said comparison of said fuel consumption rate if the current shift position is not determined to be said highest gear or said neutral position; and said second comparing means comprises second determination means for determining whether said current shift position is first gear, and for enabling said comparison of said fuel consumption rate if it is determined the current shift position is not said first gear.

3. A system in claim 1 wherein said first comparing means comprises first calculating means for calculating one-step upshifted assumed engine speed obtained from the value of the current engine speed, multiplied by a known gear ratio for one-step-transmission upshifted, divided by the known value for the gear ratio corresponding to the current shift position, and for calculating assumed engine torque obtained from the value of current driving force divided by said assumed engine speed multiplied by a constant;

said second comparing means comprises second calculating means for calculating one-step downshifted assumed engine speed obtained from the value of the current engine speed, multiplied by a known gear ratio for one-step-transmission downshifted, divided by the known value for the gear ratio corresponding to the current shift position, and for calculating the assumed engine torque obtained from the value of current driving force divided by said assumed engine speed multiplied by a constant.

4. A system as in claim 1, wherein said representing means makes an indication to keep the shift position unchanged whenever said engine speed detected by said first detecting means is greater than a predetermined value.

5. A system as in claim 1, further comprising:

first permitting means for permitting said second determining means to determine said fuel consumption rate whenever the value of said engine torque determined by said first determining means is greater than a predetermined value; and second permitting for permitting said second determining means to determine said assumed fuel consumption rate whenever the value of said assumed engine torque calculated by said second comparing means is greater than said predetermined value.

6. A system as in claim 1, wherein said representing means represents changes in said first, second and third signals, indicative of upshifting, downshifting and keeping shift position unchanged, respectively, after a predetermined time delay.

7. A method for indicating shift position for a manual transmission associated with an internal combustion engine so as to maintain optimum fuel consumption by the engine, comprising the steps of:

detecting the current engine speed;

detecting the current throttle position;

detecting the current shift position;

determining current engine torque based on said current engine speed and current throttle in accordance with a first two-dimensional map of engine speed and throttle position;

determining current fuel consumption rate based on said current engine speed and determined current engine torque in accordance with a second two-dimensional map of engine speed and engine torque in accordance with a second two-dimensional map of engine speed and engine torque, said second map including isometric curves representing curves of equal fuel consumption rates;

calculating driving force of the engine in accordance with current engine speed and current engine torque;

comparing said current fuel consumption rate with an assumed one-step upshifted fuel consumption rate determined by one-step upshifted engine speed and one-step upshifted engine torque defined by said second map;

comparing said current fuel consumption rate with an assumed one-step downshifted fuel consumption rate determined by one-step downshifted engine speed and one-step downshifted engine torque defined by said second map;

outputting a first signal indicative of one-step upshifting, a second signal indicative of one-step downshifting, or a third signal indicative of stopping both one-step upshifting and downshifting, respectively, if the assumed fuel consumption rate of one-step upshifting is less than the current detected fuel consumption rate, the assumed fuel consumption rate of one-step downshifting is less than the current detected fuel consumption rate, or both values of fuel consumption rate are determined greater than the current detected fuel consumption rate;

representing to an operator of said engine the respective three signals for executing upshifting, downshifting and keeping the shift position unchanged.

8. A method as in claim 7, wherein the first comparing step includes determining whether the current gear position is the highest gear or neutral position, and for enabling said comparison of said fuel consumption rate if the current shift position is not determined to be said highest gear or said neutral position; and the second comparing step includes determining whether said current shift position is the first gear, and for enabling said comparison of said fuel consumption rate if it is determined the current shift position is not the first gear.

9. A method as in claim 7, wherein the first comparing step includes calculating one-step upshifted assumed engine speed obtained from the value of the current engine speed, multiplied by a known gear ratio for one-step upshifted, divided by the known value for the gear ratio corresponding to the current shift position, and calculating assumed engine torque obtained from the value of current driving force divided by said assumed engine speed multiplied by a constant; and the second comparing step includes calculating one-step downshifted assumed engine speed obtained from the value of the current engine speed, multiplied by a known gear ratio for one-step downshifted, divided by the known value for the gear ratio corresponding to the current shift position, and calculating the assumed engine torque obtained from the value of current driving force divided by said assumed engine speed multiplied by a constant.

10. A method as in claim 7, wherein the representing step includes the step of indicating to keep the shift position unchanged when the engine speed is greater than a predetermined value.

11. A method as in claim 7, further including the steps of:
- permitting the determining of the fuel consumption rate whenever the value of engine torque determined in the first determining step is greater than a predetermined value; and
- permitting the determining of assumed fuel consumption rate whenever the value of assumed engine torque determined in the second comparing step is greater than the predetermined value.

12. A method as in claim 7 wherein the representing step includes the step of representing the first, second and third signals indicative of upshifting, downshifting and keeping shift position unchanged, respectively, after a predetermined time delay.

* * * * *